United States Patent Office 2,859,424
Patented Nov. 4, 1958

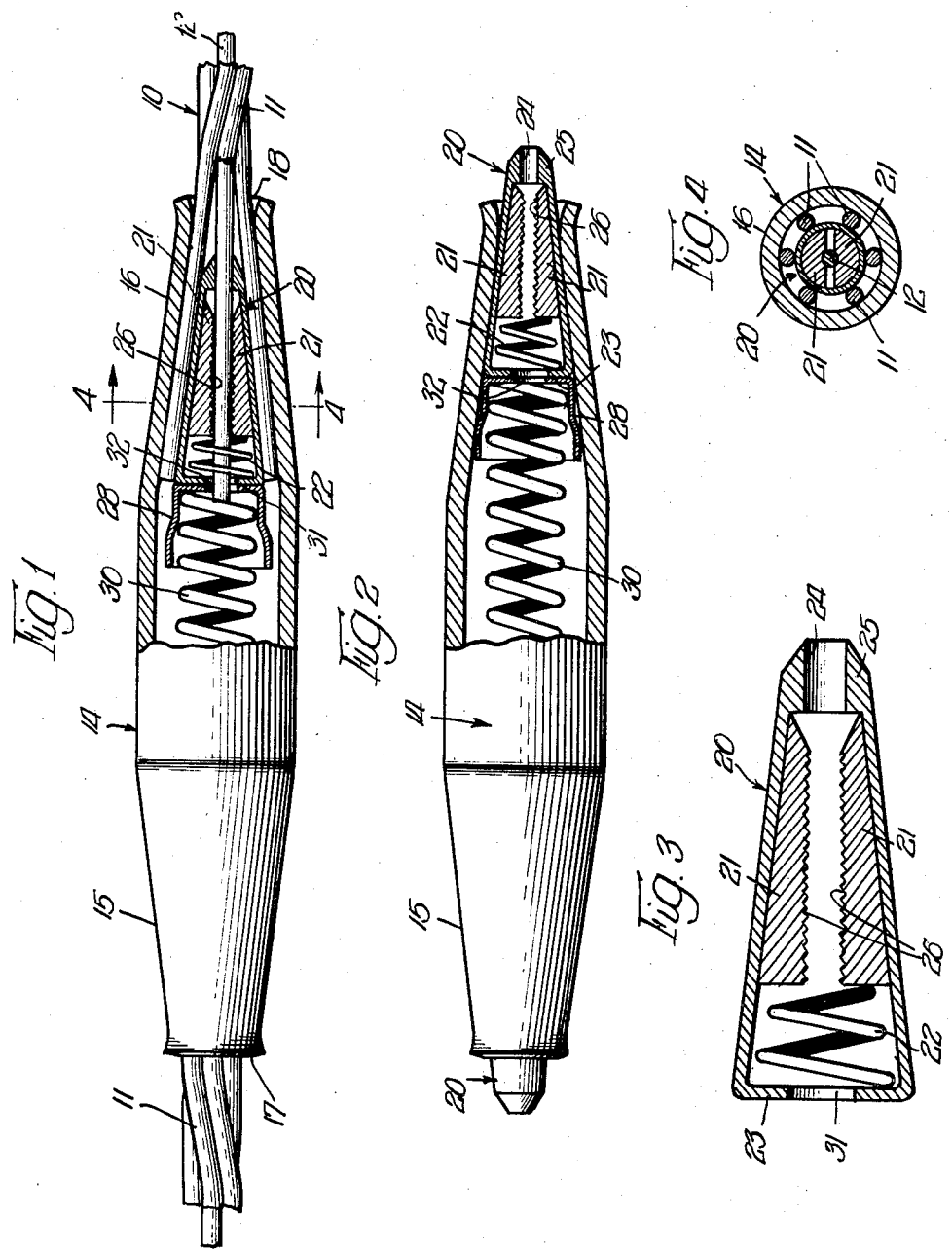

2,859,424

CONNECTOR FOR STRANDED CABLES

Arthur A. Berndt, Chicago, Ill., assignor to Electroline Company, Chicago, Ill., a corporation of Illinois Application February 7, 1956, Serial No. 564,009

6 Claims. (Cl. 339—248)

The invention relates to stranded wire connectors and has reference in particular to a new and improved connector or dead end anchor providing compound gripping means especially suited for stranded aluminum cable and types of bimetallic stranded cables.

Certain types of aluminum cable as now manufactured are provided with a central steel wire or stranded steel cable since the aluminum wires of the cable are low in tensile strength. Therefore in joining an aluminum cable to an anchor or in connecting adjacent lengths of such cable, the central steel wire or wires must be securely fastened to the anchor or connector so as to assume its proportional part of the load with only a part of the tensile strain being placed on the outer aluminum wires.

Accordingly, an object of the invention is to provide an anchor or connector for aluminum or other bimetallic cable which will independently and securely hold the center wire or wires in a manner to place the greater tensile strain thereon, and which will grip and hold each aluminum wire individually and in a manner so that a contact of high electrical conductivity will be made with the outer wires of the cable.

A further object is to provide a connector having a movable cage of tapered formation for coaction with a tapered end of the connector whereby to grip and hold the wires of a stranded cable and which will act in an effective manner to grip and hold each individual wire with increased effect as the force tending to pull the cable increases.

A more specific object is to provide a connector for stranded wire cable having a plurality of gripping jaws enclosed within a metallic cage and which is interiorly tapered for accommodating the jaws, the said taper being substantially parallel to that provided by the tapered end of the connector, whereby the center steel wire is gripped by the jaws and whereby the aluminum wires are gripped between the metallic cage and the tapered end of the connector.

Another object of the invention is to assemble within a single conducting metal shell two wire gripping instrumentalities and which in the present invention comprise a movable cage with the gripping jaws for the center wire being housed by the cage and wherein the cage itself acts as a gripping member for gripping the outer aluminum wires of the cable.

Another object of the invention is to provide resilient means within the cage for applying the desired compression to the gripping jaws therein and in combination therewith to additionally provide resilient means located within the connector for applying the desired compression to the cage as a unit.

With these and various other objects in view the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is an elevational view of the stranded wire connector of the invention with parts being broken away to illustrate the structure and mode of operation of the cage and the jaws housed thereby in gripping the wires of the stranded cable;

Figure 2 is a view similar to Figure 1 but showing the several parts of the present connector in a position they will assume before the stranded cable is inserted.

Figure 3 is a sectional view of the cage showing the gripping jaws for gripping the center steel wire in combination with the resilient spring for maintaining the jaws in operative position; and Figure 4 is a sectional view taken substantially along line 4—4 of Figure 1.

The invention is shown as embodied in a connector for stranded wire or cable 10, having outer wires 11 of aluminum or similar material of high electrical conductivity and having a steel center wire 12 which assumes the major part of the tension placed on the conductor when in use. The center steel wire adequately strengthens the cable for withstanding the suspension load and therefore in joining a composite cable of this character to an anchor or when connecting adjacent lengths, it is necessary to independently and securely grip the center steel wire so that the same will assume its proportional share of the load and when this is done the outer wires are clamped in a manner to provide good electrical contact between the same and the connector, and to assume their proportional share of the load.

As best shown in Figures 1 and 2, the connector includes a housing or casing 14 of tubular form and which may be of any suitable metal such as copper, steel or aluminum, the casing having tapering end portions 15 and 16 at the respective ends thereof. In the illustrated embodiment both ends are reduced in diameter by a swaging operation and it will be observed that the metal at each end opening, identified by numerals 17 and 18, may be correspondingly increased in thickness. Each end opening is of course smaller in diameter as compared to the diameter of the cylindrical portion of the casing, although, of course, each end opening is larger in diameter than the stranded cable 10 adapted for insertion through one of the openings 17 and 18 and into gripping relation with the gripping elements of the invention located within the casing. It is desirable to flare the wall of the casing at each end opening in order to facilitate insertion of the stranded cable.

Each tapering end portion of the casing has located within the same a cage 20 of tapered formation and which houses a pair of gripping jaws 21 and resilient means 22 therefor, as best illustrated in Figure 3. The cage is preferably formed of aluminum and the exterior of the cage tapers from the rear walls 23 to the forward opening identified by numeral 24. The exterior of the cage accordingly tapers in a manner complementary to the taper of the inside walls of its particular end portion of the casing, and, as shown in Figure 2, when the cage is moved forwardly of its end portion its tapering exterior is in full contact with the tapered interior of the end portion. The opening 24 in the forward end or nose 25 of the cage is of sufficient size to receive the center steel wire of the stranded cable. The center wire upon being inserted into the cage through opening 24 will be gripped by a pair of conventional gripping jaws such as 21. Each gripping jaw is substantially wedge-shaped in longitudinal section and the same has a center groove or recess extending lengthwise thereof and which is suitably roughened by serrations providing gripping teeth 26. As regards the exterior surface of each gripping member 21 the taper thereof is complementary to the taper on the inside surfaces of the cage 20 and by means of the resilient coil spring 22 the gripping jaws are maintained in a forward operative position.

The connector of the invention is completed by the cup-shaped members 28 having operative association with the main coil spring 30. The said coil spring 30 is located centrally within the cylindrical part of the casing and the ends of the coil spring have seating relation in the members 28, respectively. As shown in Figure 2, the metallic cage 20 is forced out a short distance through the ends of the casing 17 and 18 and is held in this position by the spring 30 and cup 28. However, upon insertion of the stranded cable within a tapering end portion of the casing, the respective metallic cage is caused to move rearwardly in contact with the cup-shaped member 28 which movement will be sufficient to compress the main coil spring 30. Accordingly the members 28 under the compression exerted by the main coil spring 30 will have contact with their respective metallic cage to maintain the cage properly positioned and under proper compression for receiving the strands of the cable 10 and for in turn gripping the said strands individually in a manner which will now be described in detail.

In joining a standed wire cable to the present connector the outer aluminum strands 11 at the extreme end of the cable are held tightly together, maintaining, however, the steel strand 12 centrally located with respect thereto. The cable is now forced into an end opening of the connector such as 18, Figure 1, which requires this contracting or a gathering of the separate wires since the size of the end opening is not much larger than the exterior diameter of the cable. Upon continued insertion of the stranded cable the outer aluminum wires will tend to flare outwardly and to move into a position between the cage 20 and the tapering walls of the end portion. However, the center steel wire will be caused to enter the aluminum cage since the wire will pass through opening 24 and thus into contact with the gripping jaws 21. The gripping jaws are caused to travel rearwardly against the pressure of coil spring 22 in order to increase the space between the gripping jaws sufficient to accommodate the steel wire. Eventually the outer aluminum wires will engages the cup-shaped member 28, as shown in Figure 1, and, accordingly, the center steel wire will thereupon be located fully within the cage and between the gripping jaws and may even project through the openings 31 and 32 formed in the rear wall of the cage and in the bottom wall of the cup-shaped member, respectively. An attempt can now be made to pull the cable from the connector and this will result in a clamping action being applied to the individual wires of the cable. Each of the aluminum wires 11 will be gripped between the cage and the tapering end wall of the casing. The center steel wire will be gripped and securely held by the gripping jaws 21.

The separate gripping of the central and outer wires permits independent movement thereof and adjustment of the tension in proportion to their tensile strength. Good electrical contact is obtained both as regards the center steel wire and also the outer aluminum wires. In fact, the cage 20 makes possible the use of like metals at gripping areas, thus aluminum has gripping contact with aluminum and steel with steel. The said cage therefore comprises the unique feature of the invention. The cage and the gripping jaws may move independently of each other so that the proper gripping force and conductivity may be controlled by varying the angles between the said gripping instrumentalities and their cage or casing. The angles may vary according to the strength, hardness, conductivity and elasticity of the various metals in the cable in order to produce a successful gripping device.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. A clamp for stranded wire cable, comprising a casing having a tapered end portion, a cage within the tapered end portion of wedge shape in longitudinal section, said cage thereby providing sloping exterior surfaces complementary to the taper of the end portion, and gripping jaws within the said cage movable relative to the cage, the gripping jaws being constructed and arranged to grip and hold the center wire of the cable, and said cage functioning as a gripping member and being operative to grip the outer wires between the same and the tapered walls of the end portion.

2. A clamp for stranded wire cable, comprising a tubular casing having a tapered end portion, a cage within the tapered end portion, said cage being wedge shaped in longitudinal section and being relatively large in diameter at its rear and smaller in diameter at its nose, whereby sloping exterior surfaces are provided complementary to the taper of the end portion, gripping jaws within the said cage and movable relative to the cage, resilient means also within the cage for maintaining the gripping jaws in operative position, and other resilient means within the casing for maintaining the cage in operative position with respect to the end portion of the casing, the said gripping jaws being constructed and arranged to grip and hold the center wire of the cable, and said cage functioning as a gripping member and being operative to grip the outer wires between the same and the tapered walls of the end portion.

3. A clamp for stranded wire cable having a center steel strand and outer aluminum strands, a metal casing of tubular construction having a tapered end portion, a metal cage located within the tapered end portion, said cage having the the shape of a truncated cone and thereby providing sloping exterior surfaces which are complementary to the taper of the end portion, and gripping jaws within the said cage and movable relative to the cage, the gripping jaws being constructed and arranged to grip and hold the center wire of the cable, and said cage functioning as a gripping member and being operative to grip the outer wires between the same and the tapered walls of the end portion.

4. A clamp for stranded wire cable having a center steel strand and outer aluminum strands, a metal casing of tubular construction having a tapered end portion, a metal cage located within the tapered end portion, said cage having the shape of a truncated cone and thereby providing sloping exterior surfaces which are complementary to the taper of the end portion, gripping jaws within the said cage and movable relative to the cage, resilient means also within the cage for maintaining the gripping jaws in operative position, and other resilient means within the casing for maintaining the cage in operative position with respect to the end portion of the casing, the said gripping jaws being constructed and arranged to grip and hold the center wire of the cable upon insertion of the same within the cage, and said cage functioning as a unitary gripping member and being operative to grip the outer wires between the same and the tapered walls of the end portion.

5. A cable clamp for stranded wire cable, comprising a tubular casing having a tapering end portion, independently movable gripping instrumentalities having location within the end portion of the casing, said gripping instrumentalities including a cage of wedge shape having a rear end of relatively large diameter but less than maximum diameter of the end portion of the casing and having a forward nose section of smaller diameter than the opening in the end portion, and wedge shaped gripping jaws within the cage movable relative to the cage, the said gripping jaws being constructed and arranged to grip and hold the center wire of the cable upon insertion of the same within the cage, and said cage functioning as a gripping member and being operative to grip the outer wires between the same and the tapered walls of the end portion.

6. A cable clamp for stranded wire cable, comprising a tubular casing having a tapering end portion, independently movable gripping instrumentalities having location within the end portion of the casing, said gripping instrumentalities including a cage of wedge shape and which tapers from the rear to the forward nose section of the cage thereby providing exterior surfaces complementary to the taper of the end portion, and wedge shaped gripping jaws within the cage movable relative to the cage and having coaction with the tapering interior surface of the cage, resilient means also within the cage for maintaining the gripping jaws in operative position, and other resilient means within the casing for maintaining the cage in operative position with respect to the end portion of the casing.

References Cited in the file of this patent

UNITED STATES PATENTS 2,166,458     Berndt _____ July 18, 1939

FOREIGN PATENTS 679,221     Great Britain _____ Sept. 17, 1952